United States Patent
Ellis

(10) Patent No.: US 8,935,466 B2
(45) Date of Patent: Jan. 13, 2015

(54) DATA STORAGE SYSTEM WITH NON-VOLATILE MEMORY AND METHOD OF OPERATION THEREOF

(75) Inventor: Robert W. Ellis, Phoenix, AZ (US)

(73) Assignee: Smart Storage Systems, Inc., Chandler, AZ (US)

( * ) Notice: Subject to any disclaimer, the term of this patent is extended or adjusted under 35 U.S.C. 154(b) by 95 days.

(21) Appl. No.: 13/433,090

(22) Filed: Mar. 28, 2012

(65) Prior Publication Data

US 2012/0254519 A1    Oct. 4, 2012

Related U.S. Application Data

(60) Provisional application No. 61/468,483, filed on Mar. 28, 2011.

(51) Int. Cl.
*G06F 12/16*    (2006.01)
*G06F 12/02*    (2006.01)

(52) U.S. Cl.
CPC .... G06F 12/0246 (2013.01); *G06F 2212/7211* (2013.01)
USPC ............ 711/106; 711/103; 711/112; 365/185

(58) Field of Classification Search
USPC ........................... 711/106, 103, 112; 365/185
See application file for complete search history.

(56) References Cited

U.S. PATENT DOCUMENTS

| | | | |
|---|---|---|---|
| 4,048,481 A | 9/1977 | Bailey, Jr. et al. | |
| 4,839,587 A | 6/1989 | Flatley et al. | |
| 5,311,395 A | 5/1994 | McGaha et al. | |
| 5,479,638 A | 12/1995 | Assar et al. | |
| 5,930,504 A | 7/1999 | Gabel | |
| 5,949,785 A | 9/1999 | Beasley | |
| 5,963,893 A | 10/1999 | Sakakura et al. | |
| 6,091,652 A | 7/2000 | Haehn et al. | |
| 6,275,436 B1 | 8/2001 | Tobita et al. | |
| 6,345,367 B1 | 2/2002 | Sinclair | |
| 6,356,447 B2 | 3/2002 | Scafidi | |
| 6,381,670 B1 | 4/2002 | Lee et al. | |
| 6,529,997 B1 | 3/2003 | Debiez et al. | |
| 6,552,581 B1 | 4/2003 | Gabara | |
| 6,587,915 B1 | 7/2003 | Kim | |

(Continued)

FOREIGN PATENT DOCUMENTS

| | | | |
|---|---|---|---|
| CN | 101763490 A | * | 6/2010 |
| EP | 1 990 921 A2 | | 11/2008 |
| WO | WO 2009/042298 A1 | | 4/2009 |

OTHER PUBLICATIONS

Jim Cooke, "The Inconvenient Truths of NAND Flash Memory", "Micron Technology, Inc.", Aug. 2007, Publisher: http://www.micron.com/~/media/Documents/Products/Presentation/flash_mem_summit_jcooke_inconvenient_truths_nand.pdf, Published in: Santa Clara, CA.*

(Continued)

*Primary Examiner* — Mardochee Chery
*Assistant Examiner* — Kamal K Dewan
(74) *Attorney, Agent, or Firm* — Morgan, Lewis & Bockius LLP

(57) ABSTRACT

A method of operation of a data storage system includes: identifying a target block; configuring a command setting for maximizing a data retention period of the target block for refreshing the target block; writing a pre-archived memory block to the target block based on the command setting; and updating an archive status for sending to a host device.

22 Claims, 7 Drawing Sheets

(56) References Cited

U.S. PATENT DOCUMENTS

| | | |
|---|---|---|
| 6,618,249 B2 | 9/2003 | Fairchild |
| 6,728,913 B1 | 4/2004 | Parker |
| 6,763,424 B2 | 7/2004 | Conley |
| 6,775,792 B2 | 8/2004 | Ulrich et al. |
| 6,778,387 B2 | 8/2004 | Fairchild |
| 6,850,443 B2 | 2/2005 | Lofgren et al. |
| 6,854,070 B2 | 2/2005 | Johnson et al. |
| 6,903,972 B2 | 6/2005 | Lasser et al. |
| 6,906,961 B2 | 6/2005 | Eggleston et al. |
| 6,975,028 B1 | 12/2005 | Wayburn et al. |
| 7,082,495 B2 | 7/2006 | DeWhitt et al. |
| 7,107,389 B2 | 9/2006 | Inagaki et al. |
| 7,139,864 B2 | 11/2006 | Bennett et al. |
| 7,233,497 B2 | 6/2007 | Simon et al. |
| 7,243,186 B2 | 7/2007 | Liang et al. |
| 7,330,927 B1 | 2/2008 | Reeve et al. |
| 7,333,364 B2 | 2/2008 | Yu et al. |
| 7,350,101 B1 | 3/2008 | Nguyen et al. |
| 7,355,896 B2 | 4/2008 | Li et al. |
| 7,434,122 B2 | 10/2008 | Jo |
| 7,441,067 B2 | 10/2008 | Gorobets et al. |
| 7,516,267 B2 | 4/2009 | Coulson et al. |
| 7,613,871 B2 | 11/2009 | Tanaka et al. |
| 7,620,769 B2 | 11/2009 | Lee et al. |
| 7,639,532 B2 | 12/2009 | Roohparvar et al. |
| 7,661,054 B2 | 2/2010 | Huffman et al. |
| 7,679,948 B2 | 3/2010 | Park et al. |
| 7,738,502 B2 | 6/2010 | Chang et al. |
| 7,743,216 B2 | 6/2010 | Lubbers et al. |
| 7,818,525 B1 | 10/2010 | Frost et al. |
| 7,827,348 B2 | 11/2010 | Lee et al. |
| 7,830,164 B2 | 11/2010 | Earle et al. |
| 7,979,614 B1 | 7/2011 | Yang |
| 8,001,135 B2 | 8/2011 | Perlmutter et al. |
| 8,010,738 B1 | 8/2011 | Chilton et al. |
| 8,028,123 B2 | 9/2011 | Kilzer et al. |
| 8,046,645 B2 | 10/2011 | Hsu et al. |
| 8,051,241 B2 | 11/2011 | Feldman et al. |
| 8,072,805 B2 | 12/2011 | Chou et al. |
| 8,095,724 B2 | 1/2012 | Ji et al. |
| 8,095,765 B2 | 1/2012 | Asnaashari et al. |
| 8,117,396 B1 | 2/2012 | Fair et al. |
| 8,127,202 B2 | 2/2012 | Cornwell et al. |
| 8,145,984 B2 | 3/2012 | Sommer et al. |
| 8,154,921 B2 | 4/2012 | Mokhlesi et al. |
| 8,169,825 B1 | 5/2012 | Shalvi et al. |
| 8,219,724 B1 | 7/2012 | Caruso et al. |
| 8,219,776 B2 | 7/2012 | Forhan et al. |
| 8,228,701 B2 | 7/2012 | Sokolov et al. |
| 8,245,101 B2 | 8/2012 | Olbrich et al. |
| 8,254,172 B1 | 8/2012 | Kan |
| 8,259,506 B1 | 9/2012 | Sommer et al. |
| 8,289,801 B2 | 10/2012 | Smith et al. |
| 8,332,578 B2 | 12/2012 | Frickey, III et al. |
| 8,363,413 B2 | 1/2013 | Paquette et al. |
| 8,369,141 B2 | 2/2013 | Sommer et al. |
| 8,386,700 B2 | 2/2013 | Olbrich et al. |
| 8,407,409 B2 | 3/2013 | Kawaguchi |
| 8,464,106 B2 | 6/2013 | Filor et al. |
| 8,612,804 B1 | 12/2013 | Kang et al. |
| 2002/0159285 A1 | 10/2002 | Morley et al. |
| 2003/0046603 A1 | 3/2003 | Harari et al. |
| 2003/0074592 A1 | 4/2003 | Hasegawa |
| 2003/0163633 A1 | 8/2003 | Aasheim et al. |
| 2004/0080985 A1 | 4/2004 | Chang et al. |
| 2004/0252670 A1 | 12/2004 | Rong et al. |
| 2005/0021904 A1 | 1/2005 | Iaculo et al. |
| 2005/0038792 A1 | 2/2005 | Johnson |
| 2005/0073884 A1 | 4/2005 | Gonzalez et al. |
| 2006/0020745 A1 | 1/2006 | Conley et al. |
| 2006/0020747 A1* | 1/2006 | Estakhri et al. ............ 711/103 |
| 2006/0136682 A1 | 6/2006 | Haridas et al. |
| 2006/0143365 A1 | 6/2006 | Kikuchi |
| 2006/0253641 A1 | 11/2006 | Gatzemeier et al. |
| 2006/0256624 A1 | 11/2006 | Eggleston et al. |
| 2006/0282644 A1 | 12/2006 | Wong |
| 2006/0294574 A1 | 12/2006 | Cha |
| 2007/0061511 A1 | 3/2007 | Faber |
| 2007/0083779 A1 | 4/2007 | Misaka et al. |
| 2007/0234004 A1 | 10/2007 | Oshima et al. |
| 2007/0260811 A1 | 11/2007 | Merry, Jr. et al. |
| 2007/0263444 A1* | 11/2007 | Gorobets et al. ......... 365/185.09 |
| 2007/0276973 A1 | 11/2007 | Tan et al. |
| 2008/0046630 A1 | 2/2008 | Lasser |
| 2008/0052446 A1 | 2/2008 | Lasser et al. |
| 2008/0082736 A1 | 4/2008 | Chow et al. |
| 2008/0183918 A1 | 7/2008 | Dhokia et al. |
| 2008/0313505 A1 | 12/2008 | Lee et al. |
| 2009/0019321 A1* | 1/2009 | Radke ............... 714/54 |
| 2009/0083587 A1 | 3/2009 | Ng et al. |
| 2009/0089485 A1 | 4/2009 | Yeh |
| 2009/0138654 A1 | 5/2009 | Sutardja |
| 2009/0146721 A1 | 6/2009 | Kurooka et al. |
| 2009/0157948 A1 | 6/2009 | Trichina et al. |
| 2009/0164702 A1 | 6/2009 | Kern |
| 2009/0172262 A1 | 7/2009 | Olbrich et al. |
| 2009/0187785 A1* | 7/2009 | Gonzalez et al. .............. 714/5 |
| 2009/0222643 A1* | 9/2009 | Chu ...................... 711/209 |
| 2009/0228761 A1 | 9/2009 | Perlmutter et al. |
| 2009/0259800 A1* | 10/2009 | Kilzer et al. ................ 711/103 |
| 2009/0259819 A1 | 10/2009 | Chen et al. |
| 2009/0259896 A1 | 10/2009 | Hsu et al. |
| 2009/0323419 A1 | 12/2009 | Lee et al. |
| 2009/0327581 A1 | 12/2009 | Coulson |
| 2009/0327591 A1 | 12/2009 | Moshayedi |
| 2010/0011154 A1* | 1/2010 | Yeh ..................... 711/103 |
| 2010/0017650 A1 | 1/2010 | Chin et al. |
| 2010/0023674 A1 | 1/2010 | Aviles |
| 2010/0023956 A1 | 1/2010 | Bondurant et al. |
| 2010/0050053 A1 | 2/2010 | Wilson et al. |
| 2010/0064096 A1 | 3/2010 | Weingarten et al. |
| 2010/0070688 A1 | 3/2010 | Lin |
| 2010/0138592 A1 | 6/2010 | Cheon |
| 2010/0169541 A1 | 7/2010 | Freikorn |
| 2010/0174845 A1* | 7/2010 | Gorobets et al. .............. 711/103 |
| 2010/0217898 A1 | 8/2010 | Priborsky et al. |
| 2010/0217915 A1 | 8/2010 | O'Connor et al. |
| 2010/0228928 A1 | 9/2010 | Asnaashari et al. |
| 2010/0262792 A1 | 10/2010 | Hetzler et al. |
| 2010/0262795 A1 | 10/2010 | Hetzler et al. |
| 2010/0262875 A1 | 10/2010 | Hetzler et al. |
| 2010/0281207 A1 | 11/2010 | Miller et al. |
| 2010/0287328 A1 | 11/2010 | Feldman et al. |
| 2010/0293367 A1 | 11/2010 | Berke et al. |
| 2010/0312954 A1 | 12/2010 | Jeon et al. |
| 2010/0318719 A1 | 12/2010 | Keays et al. |
| 2010/0332726 A1 | 12/2010 | Wang |
| 2011/0047322 A1 | 2/2011 | Allen et al. |
| 2011/0055468 A1* | 3/2011 | Gonzalez et al. ............. 711/103 |
| 2011/0066788 A1 | 3/2011 | Eleftheriou et al. |
| 2011/0131365 A1 | 6/2011 | Zhang et al. |
| 2011/0131447 A1 | 6/2011 | Prakash et al. |
| 2011/0132000 A1 | 6/2011 | Deane et al. |
| 2011/0145473 A1 | 6/2011 | Maheshwari |
| 2011/0190963 A1 | 8/2011 | Glassl et al. |
| 2011/0191522 A1 | 8/2011 | Condict et al. |
| 2011/0191649 A1 | 8/2011 | Lim et al. |
| 2011/0199823 A1 | 8/2011 | Bar-or et al. |
| 2011/0238892 A1 | 9/2011 | Tsai et al. |
| 2011/0320687 A1 | 12/2011 | Belluomini et al. |
| 2012/0047320 A1 | 2/2012 | Yoo et al. |
| 2012/0047409 A1 | 2/2012 | Post et al. |
| 2012/0124046 A1 | 5/2012 | Provenzano |
| 2012/0124273 A1 | 5/2012 | Goss et al. |
| 2012/0151260 A1 | 6/2012 | Zimmermann et al. |
| 2012/0216085 A1 | 8/2012 | Weingarten et al. |
| 2012/0239858 A1 | 9/2012 | Melik-Martirosian |
| 2012/0266048 A1 | 10/2012 | Chung et al. |
| 2012/0331207 A1 | 12/2012 | Lassa et al. |
| 2013/0007380 A1 | 1/2013 | Seekins et al. |
| 2013/0007543 A1 | 1/2013 | Goss et al. |
| 2013/0073788 A1 | 3/2013 | Post et al. |
| 2013/0080691 A1 | 3/2013 | Weingarten et al. |

(56) References Cited

U.S. PATENT DOCUMENTS

| | | |
|---|---|---|
| 2013/0100600 A1 | 4/2013 | Yin et al. |
| 2013/0124792 A1 | 5/2013 | Melik-Martirosian et al. |
| 2014/0108891 A1 | 4/2014 | Strasser et al. |

OTHER PUBLICATIONS

Yuan Chen, "Flash Memory Reliability NEPP 2008 Task Final Report", "Jet Propulsion Laboratory, California Institute of Technology", 2009, p. 15, Publisher: http://trs-new.jpl.nasa.gov/dspace/bitstream/2014/41262/1/09-9.pdf, Published in: Pasadena, California.

Jim Cooke, "Introduction to Flash Memory", "Micron Technology, Inc.", Aug. 22-24, 2008, p. 102, Publisher: http://www.micron.com/~/media/Documents/Products/Presentation/260FMS08_Intro_to_Flash_Memory_Jim_Cooke.ashx, Published in: Santa Clara, CA.

Micron Technology, Inc., "NAND Flash 101: Introduction to NAND Flash and How to Design It In Your Next Product", "Micron Technology, Inc.", 2006, p. 27, Publisher: http://www.micron.com/~/media/Documents/Products/Technical%20Note/NAND%20Flash/145tn2919_nand_101.ashx.

Kimmo Raatikainen, "Performance Issue in Mobile Computing and Communications: Flash Memories", "University of Helsinki, Department of Computer Science", Sep. 24, 2007, p. 31, Publisher: http://www.cs.helsinki.fi/group/nodes/Papers/FlashMemories.pdf.

Esther Spanjer, "Flash Management—Why and How?", "Smart Modular Technologies", Nov. 2009, p. 14, Publisher: http://www.adtron.com/pdf/Flash%20Management%20(FINAL).pdf.

Gal et al., "Algorithms and Data Structures for Flash Memories", "ACM Computing Surveys", Jun. 2005, p. 30, vol. 37, No. 2, Publisher: http://www.tau.ac.il/~stoledo/Pubs/flash-survey.pdf, Published in: New York, NY.

Venkat et al., "Understanding MSP430 Flash Data Retention", "Texas Instruments, Application Report", Mar. 2008, p. 12, Publisher: http://www.ti.com/lit/an/slaa392/slaa392.pdf.

Cooke, "Introduction to Flash Memory (T1A)," Flash Memory Summit, Aug. 22, 2008, Micron Technology, Inc., 102 pages.

Gal et al., "Algorithms and Data Structures for Flash Memories," ACM Computing Surveys, Jun. 2005, vol. 37, No. 2, 30 pages.

IBM Corporation, "Systems Management, Work Management," Version 5, Release 4, 9th Edition, Feb. 2006, pp. 1-21.

O'Brien, "SMART Storage Systems Optimus SAS Enterprise SSD Review," SMART Storage Systems, Oct. 9, 2012, 44 pages.

Spanjer, "Flash Management—Why and How?" Smart Modular Technologies, Nov. 2009, http://www.scantec.de/fileadmin/pdf/Smart_Modular/Flash-Management.pdf, 14 pages.

Texas Instruments, "Power Management IC For Digital Set Top Boxes," SLVSA10A, Sep. 2009, pp. 1-22.

International Search Report and Written Opinion dated Dec. 20, 2013, received in PCT/US2013/045282, which corresponds to U.S. Appl. No. 13/493,949, 7 pages (Ellis).

International Search Report and Written Opinion dated Jun. 12, 2014, received in PCT/US2014/018972, which corresponds to U.S. Appl. No. 13/779,352, 12 pages (Schmier).

International Search Report and Written Opinion dated May 14, 2014, received in International Patent Application No. PCT/US2014/017168, which corresponds to U.S. Appl. No. 14/076,115, 6 pages (Fitzpatrick).

International Search Report and Written Opinion dated May 14, 2014, received in International Patent Application No. PCT/US2014/017169, which corresponds to U.S. Appl. No. 14/076,148, 6 pages (Fitzpatrick).

Ulinktech, "ATA Command Table (in Alphabetic Order)," Feb. 6, 2011, https://web.archive.org/web/20110206060820/http://www.ulinktech.com/downloads/AT, 6 pages.

International Search Report dated Mar. 25, 2014, received in International Patent Application No. PCT/US2013/072400, which corresponds to U.S. Appl. No. 13/690,337, 3 pages (Ellis).

Invitation to Pay Additional Fees dated Jul. 25, 2014, received in International Patent Application No. PCT/US2014/021290, which corresponds to U.S. Appl. No. 13/791,797, 8 pages (Dean).

International Search Report and Written Opinion dated Jul. 31, 2014, received in International Patent Application No. PCT/US2014/031465, which corresponds to U.S. Appl. No. 13/851,928, 13 pages (Ellis).

International Search Report and Written Opinion dated Jul. 31, 2014, received in International Patent Application No. PCT/US2014/033876, which corresponds to U.S. Appl. No. 13/861,326, 9 pages (Fitzpatrick).

\* cited by examiner

DATA STORAGE SYSTEM WITH NON-VOLATILE MEMORY AND METHOD OF OPERATION THEREOF

CROSS-REFERENCE TO RELATED APPLICATION

This application claims the benefit of U.S. Provisional Patent Application Ser. No. 61/468,483 filed Mar. 28, 2011.

TECHNICAL FIELD

The present invention relates generally to a data storage system and more particularly to a system for storage of data in a data storage system.

BACKGROUND

The rapidly growing market for computing devices, e.g. servers, laptop computers, digital cameras, smart phones, and personal digital assistants (PDAs), is an integral facet of modern life. Recently, forms of non-volatile solid-state storage have become feasible and even preferable enabling smaller and more reliable computing devices.

Many non-volatile memory products used today employ an array of flash memory cells formed on one or more integrated circuit chips. As in all integrated circuit applications, there exists continual market pressure to increase the amount of digital data that can be stored in a given area of a silicon substrate, in order to increase the storage capacity of a given size memory card and other types of packages, or to both increase capacity and decrease size and cost per bit.

The responsiveness of flash memory cells typically changes over time as a function of the number of times the cells are erased, re-programmed, and read. This results in the memory cells becoming less reliable as the memory cells age. The result is a limited effective lifetime of the memory cells; where flash memory cells can become unreliable after a number of erasing and re-programming cycles.

In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Thus, a need remains for data storage systems with longer effective lifetimes and methods for operation. Solutions to these problems have been long sought but prior developments have not taught or suggested any solutions and, thus, solutions to these problems have long eluded those skilled in the art.

DISCLOSURE OF THE INVENTION

The present invention provides a method of operation of a data storage system, including: identifying a target block; configuring a command setting for maximizing a data retention period of the target block for refreshing the target block; writing a pre-archived memory block to the target block based on the command setting; and updating an archive status for sending to a host device.

The present invention provides a data storage system, including: a memory array having a target block; a control unit, coupled to the memory array, for configuring a command setting to maximize a data retention period of the target block; a memory interface, coupled to the memory array, for writing a pre-archived data block to the target block and for refreshing the target block; and a host interface, coupled to the control unit, for updating an archive status for sending to a host device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
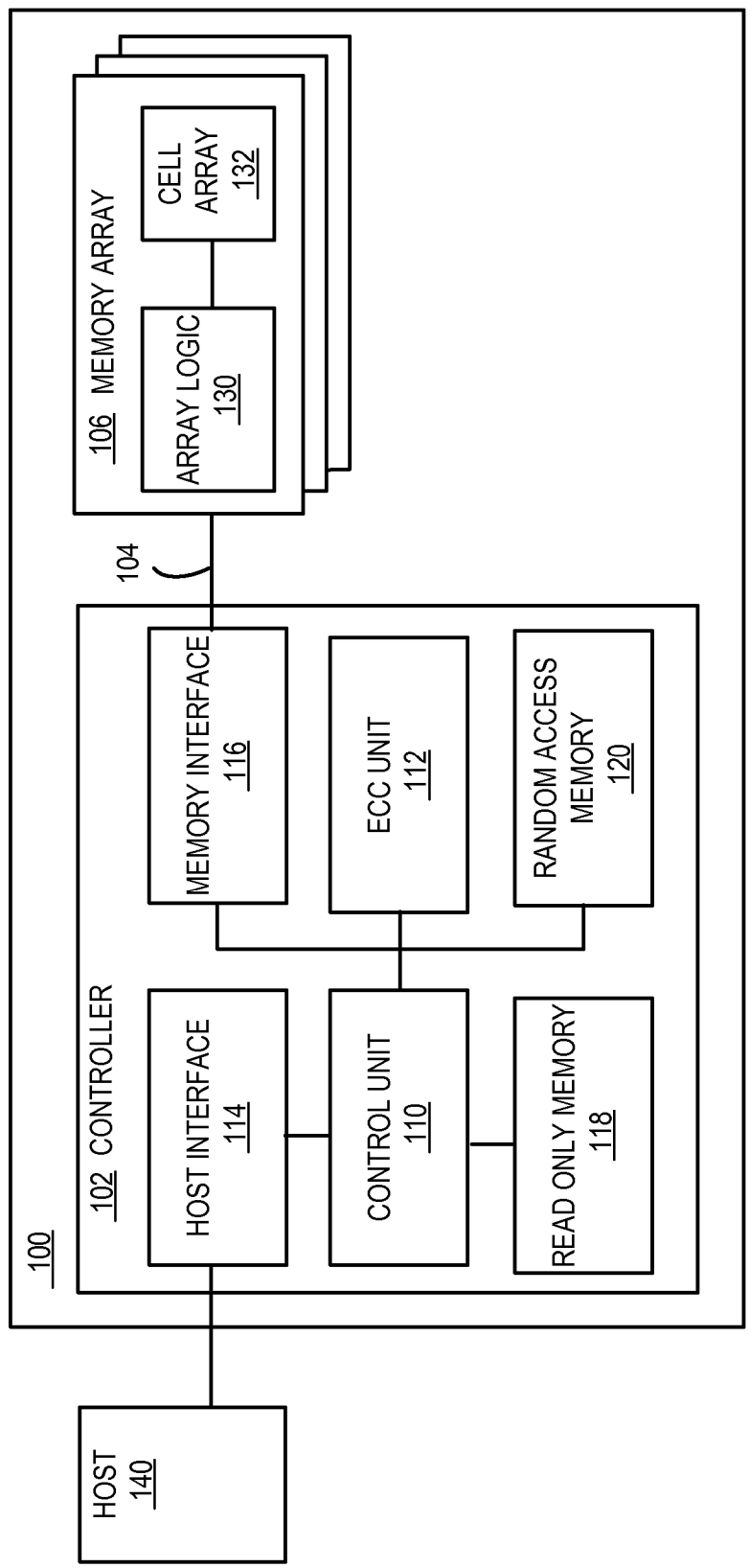
FIG. 1 is a block diagram of a data storage system in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. In addition, where multiple embodiments are disclosed and described having some features in common, for clarity and ease of illustration, description, and comprehension thereof, similar and like features one to another will ordinarily be described with similar reference numerals.

The term "module" referred to herein can include software, hardware, or a combination thereof in the context used herein. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a block diagram of a data storage system 100 in an embodiment of the present invention. The data storage system 100 includes memory arrays 106 coupled to a controller 102 via a bus 104.

The controller 102 is a processing unit for managing the storage and retrieval of data in the memory arrays 106. The controller 102 can be an embedded processor, control logic, or a combination thereof. The controller 102 can transfer stored data from the memory arrays 106 to a host device 140.

The memory arrays 106 are non-volatile memory units for storing data. The memory arrays 106 can include NAND flash memory arrays, NOR flash memory arrays, other non-volatile memory arrays, or a combination thereof.

The memory arrays 106 can include a cell array 132. The cell array 132 is a set of non-volatile flash memory cells for storing data. For example, the cell array 132 can include a single-level cell flash memory (SLC), a multi-level cell flash memory (MLC), a mixed functionality cell, or a combination thereof.

The memory arrays 106 can include an array logic unit 130 coupled to the cell array 132. The array logic unit 130 is circuitry to provide addressing, data transfer and sensing, and other support to control the memory arrays 106 for saving and retrieving information from the cell array 132.

The controller 102 can include a memory interface 116 coupled to the bus 104. The memory interface 116 can include circuitry for communicating with the memory arrays 106 over the bus 104.

The controller 102 can include a control unit 110 coupled to the memory interface 116 and a host interface 114. A read only memory 118 can be coupled to the control unit 110. A random access memory 120 can be coupled to the control unit 110 and to the read only memory 118. The random access memory 120 can be utilized as a buffer memory for temporary storage of data being written to or read from the memory arrays 106.

The controller 102 can include an error correction code unit 112 coupled to the control unit 110. The error correction code unit 112 is a processing hardware for calculating an error correction code value that can be used to detect errors, correct errors, or a combination thereof in data stored or transmitted from the memory arrays 106. The error correction code unit 112 can calculate one or more error correction code values using different methods including a Reed-Solomon code, a Hamming code, a Bose-Chauduri-Hocquenghem (BCH) code, low-density parity-check (LDPC), or a combination thereof. Although the error correction code unit 112 is a dedicated element for calculating error correction codes, it is understood that error correction codes can also be calculated in other ways, such as using the control unit 110 to calculate error correction codes.

The controller 102 can include the host interface 114 coupled to the host device 140. The host device 140 is a computing device that can use the data storage system 100 for storing data. For example, the host device 140 can be a laptop computer, a server, a smart phone, or a combination thereof.

The host interface 114 can communicate commands and data between the host device 140 and the controller 102 for the operation of the data storage system 100. For example, the host interface 114 can detect a connection to the host device 140 and generate command based on the connection to the host device 140.

Figure 2:
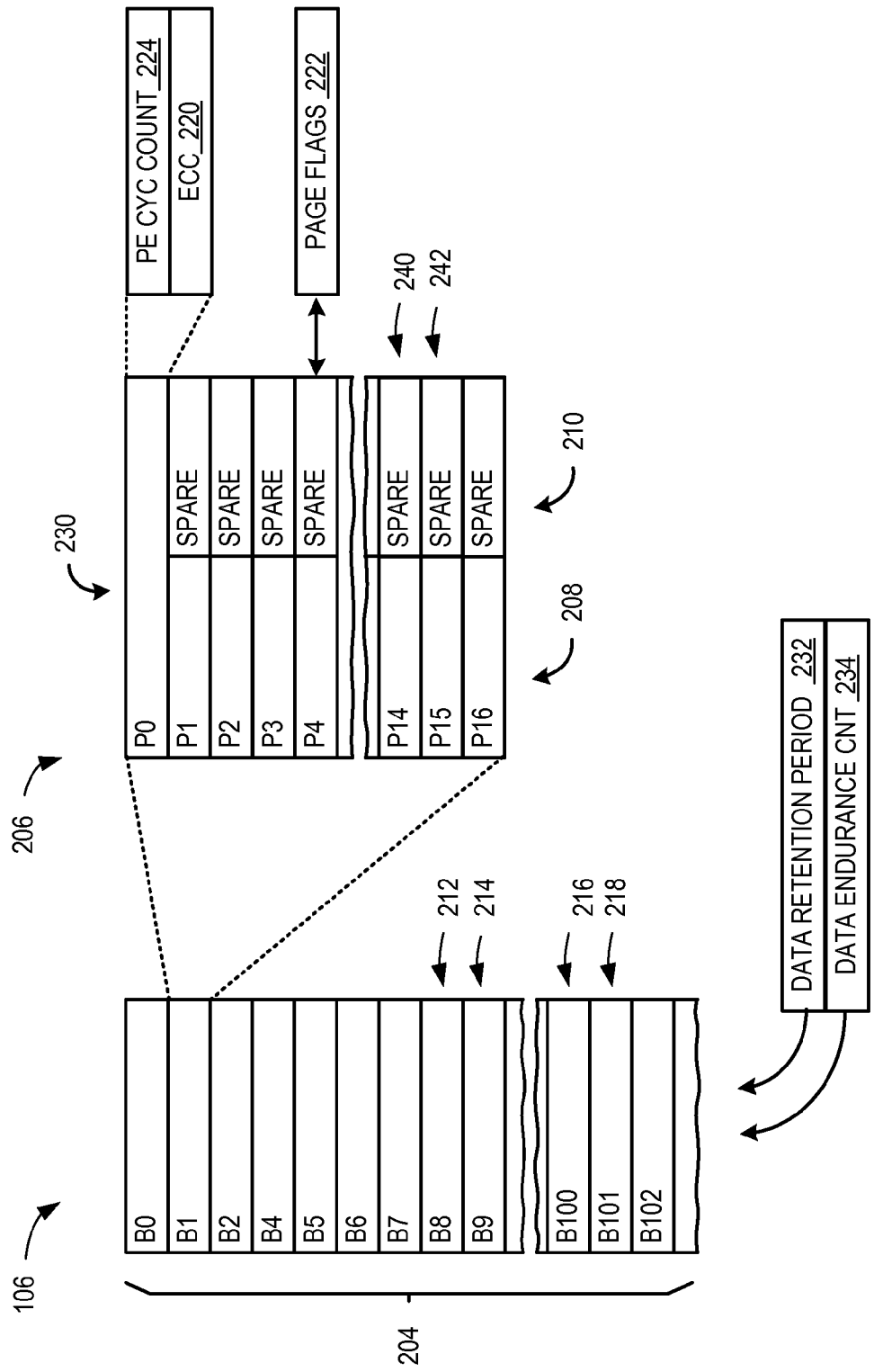
FIG. 2 is a memory array block diagram of the data storage system of FIG. 1.

Referring now to FIG. 2, therein is shown a memory array block diagram of the data storage system 100 of FIG. 1. Each of the memory arrays 106 can include the cell array 132 of FIG. 1 and the array logic unit 130 of FIG. 1.

The memory arrays 106 can include memory blocks 204. The memory blocks 204 are defined as portions of the memory arrays 106 for storing data that are the smallest addressable unit for erase operations.

The memory arrays 106 can be updated by erasing the memory blocks 204 and programming new data into the memory blocks 204 that have been erased. Programming the memory blocks 204 writes data into the memory blocks 204.

The memory blocks 204 can include the memory pages 206. The memory pages 206 are defined as the smallest addressable units within the memory blocks 204 that can be used for reading and programming data. In an illustrative example, the memory arrays 106 can have 4,096 of the memory blocks 204 with each of the memory blocks 204 having 64 of the memory pages 206 and each of the memory pages 206.

Data stored in the memory blocks 204 has a data retention period 232. The data retention period 232 is defined as the length of time data written to the memory blocks 204 can be reliably read and recovered. Data retention can include the ability of a data bit to retain a data state over a period of time.

Data stored in the memory blocks 204 can fail to be reliably read because of a variety of data errors. For example, data errors can occur based on the age of the data stored, structural limitations of the memory technology used, read and write operations on neighboring memory locations, or a combination thereof.

The data retention period 232 can be influenced by a variety of factors. For example, the data retention period 232 can be determined based on the data retention of individual bits of data stored in the memory blocks 204, the bit error rate of the memory arrays 106, and the level of error correction coding used to detect and correct data errors.

The memory blocks 204 can be erased and programmed a finite number of cycles before becoming unable to reliably retain data. The memory blocks 204 have a limited data endurance. Data endurance is defined as a measure of the number of program and erase cycles one of the memory blocks 204 can sustain before being unable to reliably retain data. The data endurance can be represented by a data endurance count 234 representing the estimated maximum number of program erase cycles the memory blocks 204 can be reliably programed and erased.

The memory blocks 204 can be associated with information about the configuration and status of the memory blocks 204. For example, the memory blocks 204 can include information about the number of program and erase, error correction code information, redundancy information, or a combination thereof. Each of the memory blocks 204 can include one or more of the memory pages 206 used to store configuration and status information.

The memory blocks 204 can include a program erase cycle count 224. The program erase cycle count 224 is the number of times one of the memory blocks 204 has been erased and programmed. Because flash memory has a limited number of cycles that it can be erased and programmed and still reliably store data, the program erase cycle count 224 can indicate the degree of usage for each of the memory blocks 204.

The memory blocks 204 can include an error correction code 220. The error correction code 220 is defined as a calculated value used to detect errors, correct errors, or a combination thereof in the payload data. The error correction code 220 can provided redundancy information that can be used to correct errors. The error correction code 220 effectively increases the data retention period 232 as measured by the amount of time that the data of the memory blocks 204 can be reliably read by correcting data errors that may have occurred.

The error correction code 220 can be calculated for different types and portions of data including for the memory pages 206, the memory blocks 204, or a combination thereof. The error correction code 220 can be stored in a variety of locations including the memory pages 206, the memory blocks 204, the memory arrays 106, or a combination thereof.

The memory arrays 106 can include an overprovisioning area 230. The overprovisioning area 230 is defined as a portion of the memory arrays 106 that can be used for memory management and configuration. For example, the overprovisioning area 230 can be used for scratch pad memory, wear leveling, and spare memory for live replacement of unreliable memory. The overprovisioning area 230 can be used for storing block information, the error correction code 220, status information, bad block replacement, or a combination thereof.

The size of the overprovisioning area 230 can be the difference between the physical memory capacity of the data storage system 100 and the logical capacity available for storing payload data. For example, the size of the overprovisioning area 230 can be between 0%-28% of the overall memory size of the memory arrays 106. A disk storage system 100 having a rated capacity of 100 GB can include 28 GB in the overprovisioning area 230.

Each of the memory pages 206 can include a data area 208 and a spare area 210. The data area 208 is defined as a portion of the memory pages 206 used to store payload data. Payload data can include user data such as programs, images, video information, text, or a combination thereof.

The spare area 210 is defined as a portion of the memory pages 206 used to store information about the memory pages 206. The spare area 210 can include status and control information such as the error correction code information, page status flags 222, or a combination thereof.

The memory pages 206 can include the page status flags 222 to represent the configuration and status of the memory pages 206. For example, the page status flags 222 can include values indicating valid payload data, erasure status, erasure count, or a combination thereof.

The memory pages 206 can include fast pages 240 and slow pages 242. For example, in multi-level cell flash memory, two of the memory pages 206 can be represented with the most significant bits (MSB) and the least significant bits (LSB) of a floating gate cell of the multi-level cell flash memory. The fast pages 240 can be the memory pages 206 that are associated with the most significant bit of the multi-level cell flash memory. The slow pages 242 can be the memory pages associated with the least significant bit (LSB) of a multi-level cell flash memory.

The fast pages 240 and the slow pages 242 can be implemented in a variety of ways. For example, a multi-level flash memory cell can be associated with two of the memory pages 206, one of the fast pages 240 and one of the slow pages 242. The first time one of the fast pages 240 is written after being erased, the page only needs to be written in a single operation. When one of the slow pages 242 associated with the previously written one of the fast pages 240 is written, the current values of the multi-level cells have to be read and then written back to update the values of the multi-level cell for both the fast pages 240 and the slow pages 240. In an illustrative example, the time to write one of the fast pages 240 can be on the order of 500 µs. The time to write one of the slow pages 242 can be on the order of 1800 µs.

In yet another example, the fast pages 240 of the multi-level cell flash memory can operate similar to single-level cell flash memory by only writing payload data to the fast pages 240 and not writing to the slow pages 242. Using only the fast pages 240 can reduce the effective storage capacity 50%, but increase the data retention period 232 of the flash memory. In an illustrative example, if the payload data of the flash memory occupies less than 50% of the storage capacity, the payload data can be archived by copying the payload data to only the fast pages 240 to increase data retention.

The data of the memory pages 206 of the memory blocks 204 can be protected using the error correction code 220 during read and write operations. In an illustrative example, when the data of one of the memory pages 206 is written to one of the memory blocks 204, the payload data can be passed to the error correction code unit 112 of FIG. 1 and used to calculate the error correction code 220 to protect the payload data. The error correction code 220 can be stored in the spare area 210 and associated with the payload data stored in the data area 208.

On retrieval from the memory pages 206, another of the error correction code 220 can be calculated for the retrieved payload data and compared to the error correction code 220 that was originally stored with the payload data. If the two versions of the error correction code 220 are identical, then there are no data errors. If the two versions are different, then an error has occurred and the error correction code 220 can be used to correct the data error.

The size and type of the error correction code 220 can determine the number of data errors that can be detected, corrected, or a combination thereof. Stronger error correction code information can correct larger numbers of data errors and effectively increase the amount of time data can reliably be read by allowing the correction of more data errors over time. Error correction and detection can be strengthened by increasing the size of the error correction code 220, utilizing a different type of code, combining multiple error correction codes for the same payload data, or a combination thereof.

The error correction code 220 can be concatenated to combine two or more different error correction codes to increase the level of error detection and correction and increase effective data retention. For example, the memory blocks 204 can be protected by the error correction code 220 utilizing a Reed Solomon code, a BCH code, and an LDPC.

The error correction code 220 can be calculated to accommodate specific conditions that may affect the number of data errors. In an illustrative example, if the data storage system 100 will be stored in a thermally hot storage location, such as in a military aircraft parked in the desert, then the type and size of the error correction code 220 can be configured to allow recovery from a larger number of data errors over a given time interval.

For example, the error correction code 220 can be calculated at the time the payload data is stored using a BCH code that can correct up to 55 bit errors per 512 byte page. The ability to recover from a larger number of data errors can allow the data to be recovered for a longer period of time resulting in longer effective data retention.

Error correction can occur at different levels with the data storage system 100. For example, the error correction code 220 can be calculated for the data of one of the memory pages 206 and can be stored in the spare area 210 of the memory pages 206. However, it is understood that the data storage system 100 can include the error correction code 220 stored in other locations including the overprovisioning area 230 of the memory blocks 204, other instances of the memory blocks 204, other dissimilar non-volatile memory, or a combination thereof. The data storage system 100 can include the error correction code 220 calculated for the data of the memory pages 206 and another of the error correction code 220 calculated for the data of the memory blocks 204.

The memory blocks 204 can include a target block 212. The target block 212 is one of the memory blocks 204 that is available for writing new data. The target block 212 is the intended destination of the next block of payload data to be written to the data storage system 100. The target block 212 can be selected from the available set of the memory blocks 204 not currently used to hold valid payload data.

The memory blocks 204 can include an erase block 214. The erase block 214 is the smallest portion of the flash memory that can be erased in a single operation. The erase block 214 can be one of the memory blocks 204 memory blocks 204 identified as being available to be erased to make new storage space available. For example, the erase block 214 can be one of the memory blocks 204 that has recently been rewritten to the target block 212 and is no longer needed.

The payload data stored in the memory blocks 204 is normally configured to maximize the data endurance of the memory blocks 204 for routine usage. To facilitate longer term storage, the payload data stored in the memory blocks 204 can be archived to increase data retention.

Archiving is defined reading and programming the payload data from one of the memory blocks 204 to another of the memory blocks 204 with storage settings configured to increase the amount of time the payload data can be reliably read. For example, the data storage system 100 can be archived by reading all of the payload data and writing the payload data to new memory locations in the memory blocks 204.

The payload data stored in the memory blocks 204 can include a pre-archived data block 216. The pre-archived data block 216 is one of the memory blocks 204 having stored payload data before it has been archived. The pre-archived data block 216 can include payload data that has been programmed in one of the memory blocks 204 with storage settings configured to increase the total number of program and erase cycles for the memory blocks 204.

The memory blocks 204 can include an archived data block 218. The archived data block 218 is one of the memory blocks 204 having payload data that has already been archived to increase the amount of time the payload data can be reliably read. The archived data block 218 has been programmed to increase data retention.

To facilitate normal operation, the payload data in the archived data block 218 can be restored to another of the memory blocks 204 to refresh the data and increase data endurance. Restoring is defined reading the payload data in the archived data block 218 and programming the target block 212 with storage settings configured to increase the maximum number of program and erase cycles of the target block 212. The archived data block 218 represents the payload data on the data storage system 100 after it has been archived for maximum data retention.

Figure 3:
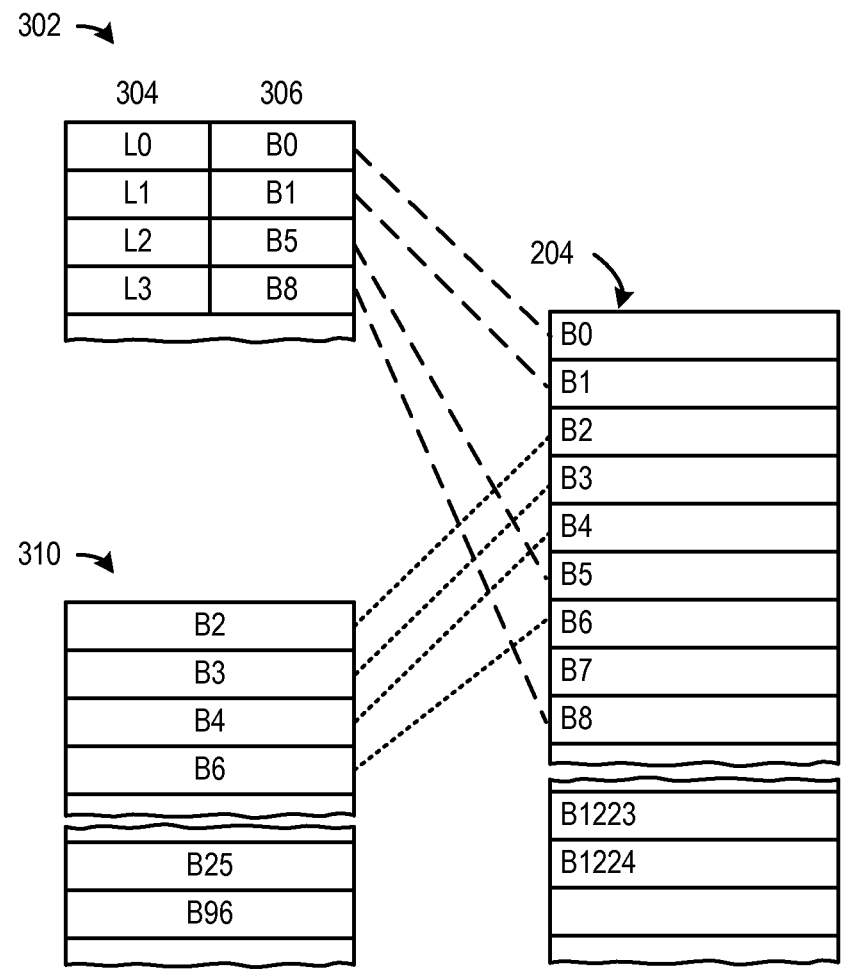
FIG. 3 is a memory map diagram of the data storage system of FIG. 1.

Referring now to FIG. 3, therein is shown a memory map diagram of the data storage system 100 of FIG. 1. The data storage system 100 can include the memory blocks 204 having a logical to physical table 302 and an erase block pool 310.

The data storage system 100 can include the logical to physical table 302 for mapping a logical block address 304 to a physical block address 306. The logical to physical table 302 allows mapping the logical blocks to different physical blocks as the data in one of the memory blocks 204 is moved or copied to a different location in the memory arrays 106 of FIG. 1.

The data storage system 100 can include the erase block pool 310. The erase block pool 310 is defined as a set of the memory blocks 204 that have been erased to provide storage space for new data to be written. The erase block pool 310 is a dynamic list and can grow and shrink as the memory blocks 204 are no longer needed after being copied or updated in another of the memory blocks 204.

For example, when the data of the pre-archived data block 216 of FIG. 2 is read and programmed to the target block 212 of FIG. 2, the pre-archived data block 216 can be identified as no longer containing valid data. Only the memory blocks 204 having valid payload data stored in the memory pages 206 are archived and rewritten. The pre-archived data block 216 can be recycled by erasing the pre-archived data block 216 and tagging the pre-archived data block 216 as the erase block 214. The erase block 214 of FIG. 2 can be assigned to the erase block pool 310 for later use.

Figure 4:
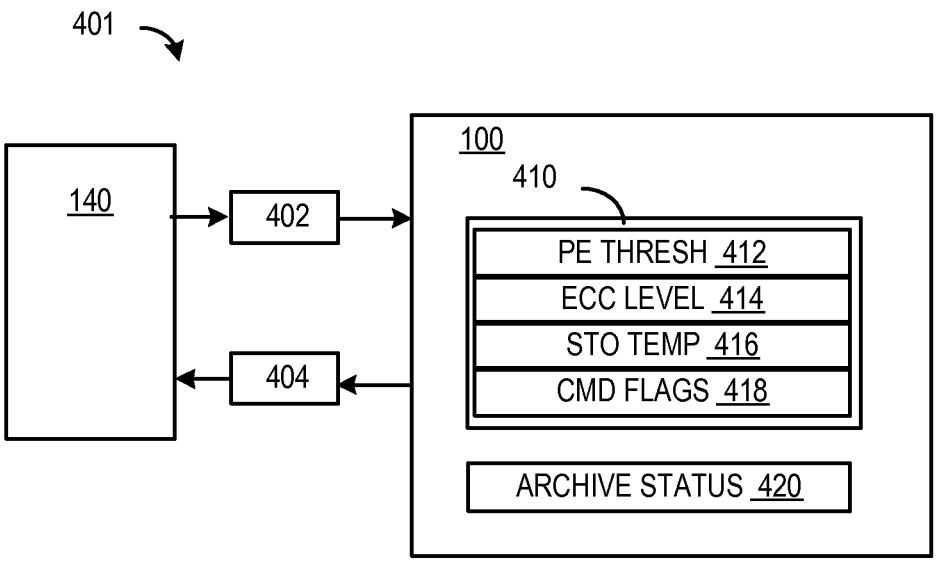
FIG. 4 is an archive command flow diagram of the data storage system of FIG. 1.

Referring now to FIG. 4, therein is shown an archive command flow diagram 401 of the data storage system 100 of FIG. 1. The archive command flow diagram 401 can depict command and message flow between the host device 140 and the data storage system 100 for an archive command 402. The archive command 402 is an instruction to the data storage system 100 to preserve the payload data for maximum data retention.

The data storage system 100 can receive the archive command 402 sent by the host device 140. After receiving the archive command 402, the data storage system 100 can set an archive status 420 to indicate that the execution of the archive command 402 has been initiated. For example, the archive status 420 can be set to "Archive in progress". The archive status 420 can represent the state of the data storage system 100.

After the archive status 420 has been set, the data storage system 100 can begin archiving the payload data in the memory arrays 106 of FIG. 1 by copying the payload data to new memory locations to increase data retention by refreshing the data. Copying is defined as reading the payload data and programming the payload data in the new memory locations. When all of the payload data has been archived, the archive status 420 can be set to indicate that the archive command 402 has completed. For example, the archive status 420 can be set to "Archive complete".

Once the archive command 402 has been received, the data storage system 100 can insure completion by restarting the execution of the archive command 402 if process is interrupted. For example, the execution of the archive command 402 can be interrupted if the data storage system 100 is removed from the host device 140.

When the data storage system 100 is reconnected to the host device 140, the archive status 420 can be checked and if the archive status 420 indicates that the execution of the archive command 402 has not been completed, then the execution of the archive command 402 can be restarted. The archive status 420 can be checked each time the data storage system 100 is reconnected to the host device 140 until the archive status 420 indicated that all of the payload data has been archived. To insure data integrity, the data storage system 100 can prevent access to the payload data until the archive status 420 indicates the completion of the execution of the archive command 402.

The data storage system 100 can archive data by copying the data of the pre-archived data block 216 of FIG. 2 to the target block 212 of FIG. 2 to refresh the data. When the data has been archived, the data storage system 100 can update the archive status 420 stored in non-volatile memory to indicate the data has been archived and send an archive status message 404 to the host device 140. The archive status message 404 can include the archive status 420.

The data storage system 100 can include a set of commands for transferring and managing data. For example, the set of commands can include an erase a block command, a program a page command, a copy a block command, read a page command, or a similar command.

The data storage system 100 can include command settings 410 used to modify the storage of data. The command settings 410 are defined as control values that can alter the behavior and operation of the commands executed on the data storage system 100. For example, the command settings 410 can include a program erase threshold 412, an error correction code level 414, a storage temperature 416, command flags 418, or other information for controlling the storage and retrieval of data.

The program erase threshold 412 can represent a limit of the number of program and erase (PE) cycles of the memory blocks 204 of FIG. 2 for use in the archival of data. For example, if the target block 212 has the program erase cycle count 224 of FIG. 2 greater than or equal to the program erase threshold 412, then the target block 212 can be replaced with another one of the memory blocks 204 with the program erase cycle count 224 having a lower value.

The error correction code level 414 is a value to specify the type and size of the error correction codes used during the reading and programming of data. The error correction code level 414 can be used to expressly override the default error correction code used by the data storage system 100. For example, the error correction code level 414 can be set to indicate a BCH error correction code should be calculated for each of the memory pages 206 of FIG. 2.

The storage temperature 416 is the expected storage temperature of the data storage system 100 after archival of the data. For example, the storage temperature 416 can represent a single storage temperature or a temperature range.

The storage temperature 416 can be used as a factor to estimate the potential data error rate of the environment where the data storage system 100 will be stored, such as a thermally hot environment. For example, if the storage temperature 416 is 55 degrees Celsius, then the data storage system 100 can compensate for the higher temperature by using a stronger error correction coding, such as a longer BCH code, when archiving data to compensate for the potentially higher data error rate. In another example, the bit error rate of the data storage system 100 can increase by a factor of five to ten as the storage temperature increases from 40 degrees Celsius to 55 degrees Celsius.

The command flags 418 can represent control information for modifying the operational characteristics of the data storage system 100. The command flags 418 can be used to modify the timing, duration, and voltage levels of control signals used to read, store, and erase data in the memory arrays 106. For example, the command flags 418 can be modified to control the voltage level used when erasing one of the memory blocks 204 to enhance data retention by imparting a higher level of charge in the floating gate transistors of the cell arrays 132 of FIG. 1. In another example, the command flags 418 can be used to control the duration of write signals to the cell arrays 132.

For example, the data retention period 232 can be increased by determining the bit error rate calculated by the error correction code unit 112 of FIG. 1 when writing to the target block 212. Based on the bit error rate, the command flags 418 can be modified to change a read threshold to improve the bit error rate. The command flags 418 can be modified to adjust the read threshold to reduce the bit error rate to be correctable by the error correction code unit 232 implementing the error correction code level 414.

Figure 5:
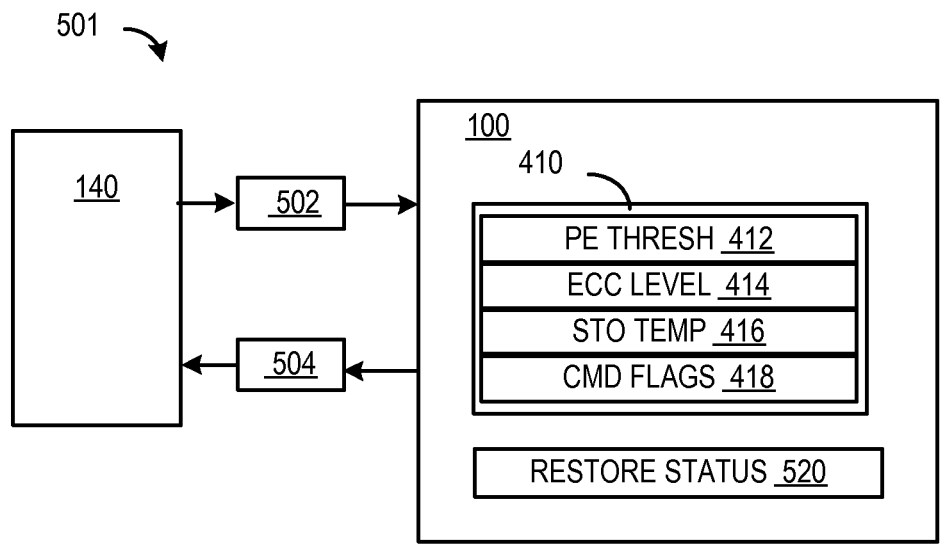
FIG. 5 is a restore command flow diagram of the data storage system of FIG. 1.

Referring now to FIG. 5, therein is shown a restore command flow diagram 501 of the data storage system 100 of FIG. 1. The restore command flow diagram 501 can depict command and message flow between the host device 140 and the data storage system 100 for a restore command 502. The restore command 502 is an instruction to the data storage system 100 to restore the archived data to the memory blocks 204 optimized for maximum data endurance.

The data storage system 100 can receive the restore command in a variety of ways. For example, the data storage system 100 can receive the restore command 502 from the host device 140 to initiate the restore process. In another example, the data storage system 100 can automatically generate the restore command 502 when the data storage system 100 detects the connection to the host device 140. In yet another example, the data storage system 100 can trigger the restore command 502 when it receives operating electrical power.

After receiving the restore command, the data storage system 100 can set a restore status 520 to indicate that the execution of the restore command has been initiated. For example, the restore status 520 can be set to "Restore in progress". The restore status 520 can represent the state of the data storage system 100.

Once the restore command 502 has been received, the data storage system 100 can insure completion by restarting the execution of the restore command 502 if process is interrupted. For example, the execution of the restore command 502 can be interrupted if the data storage system 100 is removed from the host device 140.

When the data storage system 100 is reconnected to the host device 140, the restore status 520 can be detected and if the restore status 520 indicates that the execution of the restore command 502 has not completed, then the execution of the restore command 502 can be restarted. The restore status 520 can be checked each time the data storage system 100 is reconnected to the host device 140 until the restore status 420 indicates that all of the archived data has been restored. To insure data integrity, the data storage system 100 can prevent access to the payload data until the restore status 520 indicates the completion of the execution of the restore command 502.

After receiving the restore command 502, the data storage system 100 can restore the archived data in the memory blocks 204 of FIG. 2 by copying the archived payload data to new memory locations using the command settings 410 to maximize data endurance. Restoring data is performed by reading the archived payload data in the archived data block 218 of FIG. 2 and programming the target block 212 of FIG. 2 with the archived payload data using the command settings 410 that have been configured to maximize data endurance.

The data storage system 100 can include the command settings 410 used to modify the storage and retrieval of data. The command settings 410 can include the program erase threshold 412, the error correction code level 414, the storage temperature 416, the command flags 418, or other information for controlling the archiving and restoration of data.

When the data has been restored, the data storage system 100 can update the restore status 520 indicate the data has been restored. For example, the restore status 520 can be set to "Restore complete". The data storage system 100 can send a restore status message 504 to the host device 140 to indicate that the data storage system 100 has been restored and is ready for regular operation. The restore status message 504 can include the restore status 520.

Figure 6:
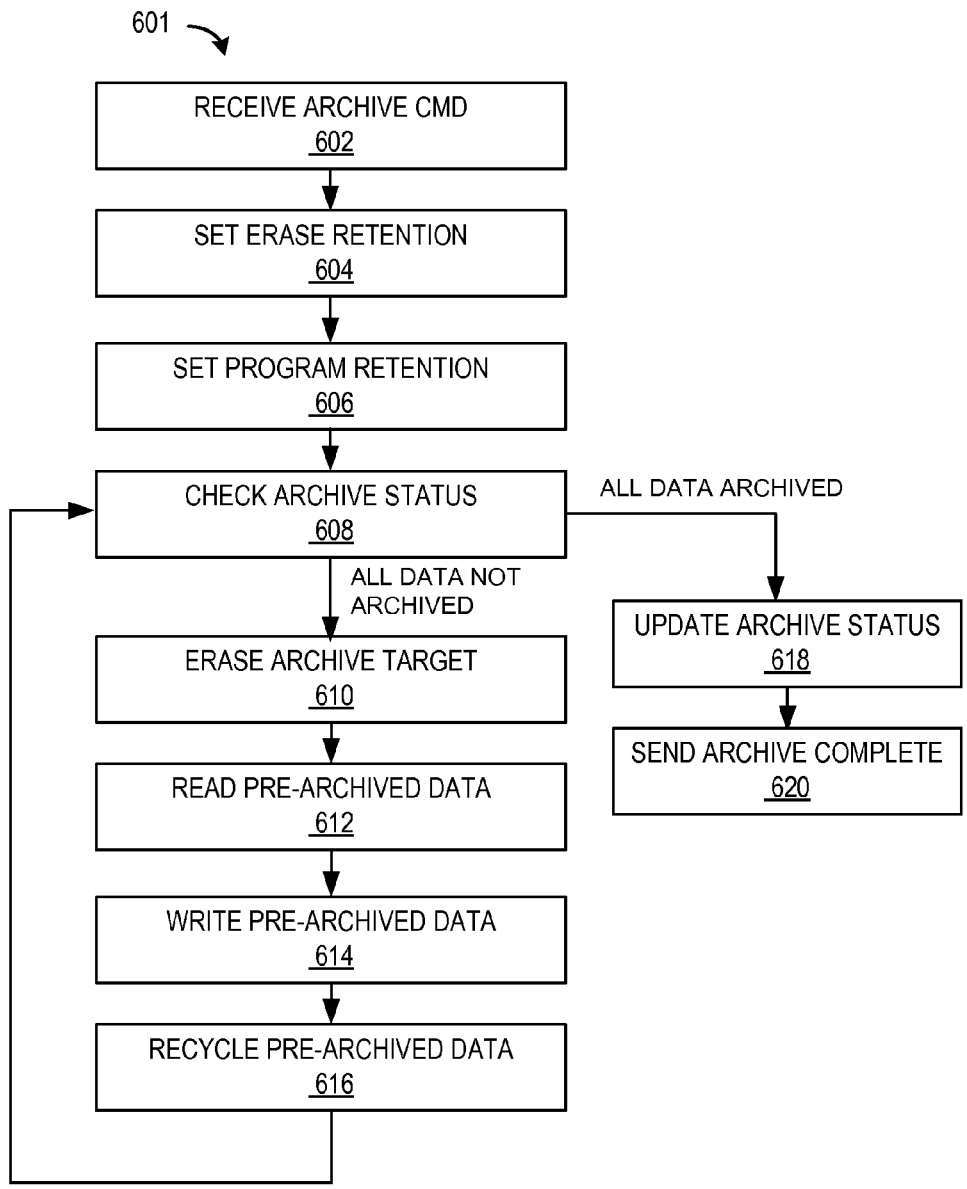
FIG. 6 is a control flow of an archive process of the data storage system of FIG. 1.

Referring now to FIG. 6, therein is shown a control flow of an archive process 601 of the data storage system 100 of FIG. 1. The archive process 601 can preserve the data of the data storage system 100 by copying the data of the pre-archived data block 216 of FIG. 2 to new data locations.

The archive process 601 can receive the archive command 402 of FIG. 4 from the host device 140 of FIG. 1 in a receive archive command module 602. Receiving the archive command can prepare the data storage system 100 of FIG. 1 to copy the existing payload data to new blocks on the data storage system 100 to maximize data retention.

The receive archive command module 602 can check and define the state of the data storage system 100 by adjusting the archive status 420 of FIG. 4 and the restore status 520 of FIG. 5. For example, the archive status 420 can be set to "Archive in progress" to indicate that archive process 601 has been started and the restore status 520 can be set to a blank value.

The control flow of the archive process 601 can proceed to a set erase retention module 604. The set erase retention module 604 can configure the command settings 410 of FIG. 4 for the erase command to maximize the data retention period 232 of FIG. 2. Data retention can be optimized without regards for data endurance.

The execution of the erase command can erase the memory blocks 204 of FIG. 2 of the data storage system 100 to prepare for programming the memory blocks 204 with new data. The set erase retention module 604 can configure the erase command to maximize the data retention period 232 in a variety of ways.

For example, the command settings 410 can include the command flags 418 of FIG. 4 set to maximize the data retention period 232 by modifying the configuration of the erase block pool 310 of FIG. 3. The command flags 418 can indicate that the erase block 214 of FIG. 2 having the program erase cycle count 224 of FIG. 2 with the lowest value can be positioned at the beginning of the erase block pool 310.

The erase block pool 310 can be effectively sorted to allow the memory blocks 204 with the lowest number of program erase cycle count 224 to be assigned to the beginning of the erase block pool 310. The target block 212 of FIG. 2 selected from the beginning of the erase block pool 310 can have the program erase cycle count 224 with a lower value and thus better data retention. In another example, the command settings 410 can be configured to insert the erase block 214 having the program erase cycle count 224 with higher values at the end of the erase block pool 310.

In another example, the command settings 410 can include the command flags 418 configured to maximize the data retention period 232 by modifying the operational characteristics used during the execution of the erase command. For example, the command settings 410 can be configured to modify the command flags 418 to increase the duration of the erase pulse to increase the amount of charge stored in the cell array 132 of FIG. 1 on erase. By increasing the amount of charge in the cell array 132, the data stored in the cell array 132 can be retained for a longer period.

In yet another example, the command settings 410 can be configured to maximize the data retention period 232 by identifying the memory blocks 204 having the program erase cycle count 224 greater than or equal to the program erase threshold 412 of FIG. 4. The memory blocks 204 exceeding the program erase threshold 412 can be eliminated from the erase block pool 310 and not used when rewriting the pre-archived data block 216. Avoiding recycling the memory blocks 204 with the program erase cycle count 224 above the program erase threshold 412 can prevent the use of the memory blocks 204 having poor data retention performance due to excessive use and higher wear.

In yet another example, the command settings 410 can be configured to modify the error correction code level 414 of FIG. 4 to maximize the data retention period 232 by erasing the target block 212 and configuring the target block 212 for a stronger level of error correction coding to be stored in the overprovisioning area 230 of FIG. 2. By increasing the level of error correction coding redundancy, the payload data stored in the target block 212 can be reliably read for a longer period of time by allowing for correction of data errors that occur over time.

For example, the target block 212 can be erased and additional space in the overprovisioning area 230 can be allocated to accommodate the error correction code 220 of FIG. 2 having a greater length. The overprovisioning area 230 can be configured to store and associate the error correction code 220 having a greater minimum distance, such as a 55 bit BCH code.

The control flow can proceed to a set program retention module 606. The set program retention module 606 can configure the command settings 410 for the program command to maximize the data retention period 232.

The execution of the program command can write data to the target block 212. The command settings 410 can be configured to maximize the data retention period 232 during the program command in a variety of ways.

For example, the command settings 410 can be configured to maximize the data retention period 232 by setting the command flags 418 to indicate that the payload data should be distributed across the maximum number of the memory blocks 204. Distributing the payload data can include copying the data of the memory pages 206 of FIG. 2 of the pre-archived data block 216 to two or more instances of the target block 212.

In another example, the command settings 410 can be configured to maximize the data retention period 232 by setting the command flags 418 to indicate that the payload data should be stored in only the fast pages 240 of FIG. 2 of the target block 212. The fast pages 240 are associated with the most significant bit of the multi-level cell flash memory. The fast pages 240 pages can represent data with large discrete charge levels that result in larger values for the data retention period 232.

In another example, the command settings 410 can be configured to maximize the data retention period 232 by increasing the error correction code level 414 when programming the target block 212 with data. In an illustrative example, the error correction code level 414 can indicate that a 64-bit Reed-Solomon code should be calculated to protect the payload data. It is understood that the error correction code level 414 can indicate the size and type of error correction coding.

In another example, the error correction code level 414 can indicate that a 55 bit BCH code should be used. In yet another example, the error correction code level 414 can indicate that a Reed-Solomon code and a BCH code should be used and concatenated together.

In yet another example, the error correction code level 414 can be adjusted based on the type of data errors detected by the data storage system 100. The error correction code level 414 can be set based on the data error type, such as burst error distribution, random error distribution, or a combination thereof.

Matching the error correction code level 414 to the type of data errors can increase the data retention period 232 of the target block 212. In an illustrative example, setting the error correction code level 414 to indicate a Reed-Solomon code can optimize for burst errors. In another illustrative example, setting the error correction code level 414 to indicate a BCH code can optimize for random data errors.

In yet another example, the error correction code level 414 can be adjusted based on the characteristics of the data errors including the direction of the bit errors. Bit errors move in one direction, either changing from binary 0 to binary 1 or changing from binary 1 to binary 0. The error correction code level 414 can be set to indicate an error correction code to take advantage of the direction of the bit error changes.

In yet another example, the error correction code 220 of FIG. 2 can be stored in the spare area 210 of FIG. 2 during the archive process 601. The error correction code 220 can also be stored in the overprovisioning area 230 of FIG. 2.

The command settings 410 can be configured to use different operational characteristics during the execution of the program command by setting the command flags 418 of FIG. 4 to select longer write duration and timing, higher programming voltages, single plane operation, or a combination thereof. For example, the command settings 410 can be configured to modify the command flags 418 to alter the duration of the program pulse to reduce the amount of charge stored in the cell array 132 during the program command.

The command flags 418 can be configured to indicate single plane operation for archiving the payload data. For example, the cell arrays 132 of FIG. 1 can be partitioned into different planes, where each plane is a subset of the memory arrays 106 of FIG. 1 that can be accessed independently.

The data storage system 100 can operate using multi-plane operations for better bandwidth, improved simultaneous data transfer performance, and reduced runtime power consumption. However, multi-plane operation can cause an increase in the bit error rate and an increased failure rate of the flash. Setting the command flags 418 for single plane operation can improve the data retention period 232 and reduced the number of data errors.

The control flow of the archive process 601 can proceed to an archive status check module 608 to determine if all of the payload data on the data storage system 100 has all been archived. If the archive status check module 608 indicates that all data has been successfully archived, then control flow passes to an update archive status module 618. The update archive status module 618 can update the archive status 420 of FIG. 4 of the data storage system 100 by setting the archive status 420 to indicate that all of the data has been copied to new locations.

After the archive status 420 has been updated, the control flow can pass to a send archive complete module 620. The send archive complete module 620 can send the archive status message 404 of FIG. 4 to the host device 140 via the host interface 114 of FIG. 1 of the data storage system 100. The archive status message 404 can inform the host device 140 that the archive process 601 has completed and the data storage system 100 can be safely removed and stored.

If the archive status check module 608 indicates that not all of the data on the data storage system 100 has been archived, then the control flow can pass to an erase target block module 610. The erase target block module 610 can identify the target block 212 and erase the target block 212 using the command settings 410 configured to maximize data retention.

The erase target block module 610 can identify the target block 212 in a variety of ways. For example, the target block 212 can be assigned to the erase block 214 at the beginning of the erase block pool 310.

In another example, if the erase block pool 310 does not have an available entry for the erase block 214, then the erase target block module 610 initiate a garbage collection process to recover the memory blocks 204 previously identified as unused to add to the erase block pool 310. The erase block pool 310 can be updated by adding the erase block 214 at the top of the list and assigning the erase block 214 to be the target block 212.

The target block 212 can be erased using the erase command with the command settings 410 configured to maximize data retention. The target block 212 can be erased and all of the data bits of the target block 212 can be set to 1.

The control flow of the archive process 601 can proceed to a read pre-archived data module 612. The read pre-archived data module 612 can identify the pre-archived data block 216 to be rewritten to the target block 212. The pre-archived data block 216 is defined as one of the memory blocks 204 of the payload data stored on the data storage system 100.

The pre-archived data block 216 can be read in a variety of ways. For example, the data can be retrieved from the pre-archived data block 216 and buffered in the random access memory 120 of FIG. 1. In another example, the pre-archived data block 216 can be identified from the list of the memory blocks 204 of the payload data and flagged as the pre-archived data block 216.

The control flow of the archive process 601 can proceed to a write pre-archived data module 614. The write pre-archived data module 614 can write the pre-archived data block 216 to the target block 212 with the command settings 410 configured to maximize the data retention period 232. The target block 212 can be configured as a high retention block that has been configured to maximize data retention. The logical to physical table 302 of FIG. 3 can be updated to replace the physical block address of the pre-archived data block 216 with the physical block address of the target block 212.

The pre-archived data block 216 can be written to the target block 212 in a variety of ways. For example, the pre-archived data block 216 can be written to the target block 212 from the random access memory 120 using the program command with command settings 410 configured to maximize the data retention period 232.

In another example, the data of the pre-archived data block 216 can be written to the target block 212 using an internal copy command optimized for data retention. The execution of the internal copy command can copy the data of the pre-archived data block 216 directly from the pre-archived data block 216 in the memory arrays 106 of FIG. 1 to the target block 212 in the memory arrays 106 without transferring the data out of the memory arrays 106.

The control flow of the archive process 601 can proceed to a recycle pre-archived data module 616. The recycle pre-archived data module 616 can recycle the pre-archived data block 216 by tagging the pre-archived data block 216 as not having valid data, erasing the pre-archived data block 216, and adding the pre-archived data block 216 to the erase block pool 310.

At the completion of the recycle pre-archived data module 616, the control flow of the archive process 601 can proceed back to the archive status check module 608. The archive process 601 can form a loop for checking the archive status 420, reading the data of the pre-archived data block 216, writing the data of the pre-archived data block 216 to the target block 212, and recycling the copied instances of the pre-archived data block 216. The loop can continue until all of the payload data has been archived. If the archive process 601 is interrupted, the next time the archive process 601 begins, the archive status 420 can be check to determine if the archive process 601 should be continued.

It has been discovered that the present invention provides improved data retention for the storage of payload data of the memory blocks 204 during the archive process by distributing the payload data across the maximum number of the memory blocks 204. By copying the data of the memory pages 206 of the pre-archived data block 216 to two or more of the target block 212, the data retention period 232 is increased due to the reduction in data errors due to bit flipping caused by writing data in neighboring memory cells.

It has been discovered that the present invention provides improved data retention for the storage of payload data of the memory blocks 204 of the memory arrays 106 during the archive process by copying the data of the pre-archived data block 216 to the target block 212 using the command settings 410 configured to maximize data retention. By copying the payload data by reading from the pre-archived data block 216 and programming the target block 212 with the payload data, the target block 212 will be refreshed and have a longer data retention period 232.

It has been discovered that the present invention provides improved data retention time for storage of the payload data of the memory blocks 204 of the memory arrays 106 by increasing the level of error correction associated with each of memory pages 206 of the memory blocks 204. The enhanced error correction can provide increased effective data retention time by detecting and correcting data errors in the memory blocks 204.

It has been discovered that the present invention provides an improved data retention period for the storage of the payload data of the memory blocks 204 by adjusting the error correction code level 414 to accommodate the type of data errors detected. By matching the error correction code level 414 to deal with different types of data errors, the data retention period 232 can be increased.

It has been discovered that the present invention provides improved data integrity during storage by copying the data of the memory blocks 204 of the memory arrays 106 to new locations to maximize the data retention period 232. Archiving the payload data stored in the memory blocks 204 can mitigate the effect of data errors that occur based on the age of data, temperature, read disturb errors, and errors due to the base level of data retention of the memory arrays 106.

Figure 7:
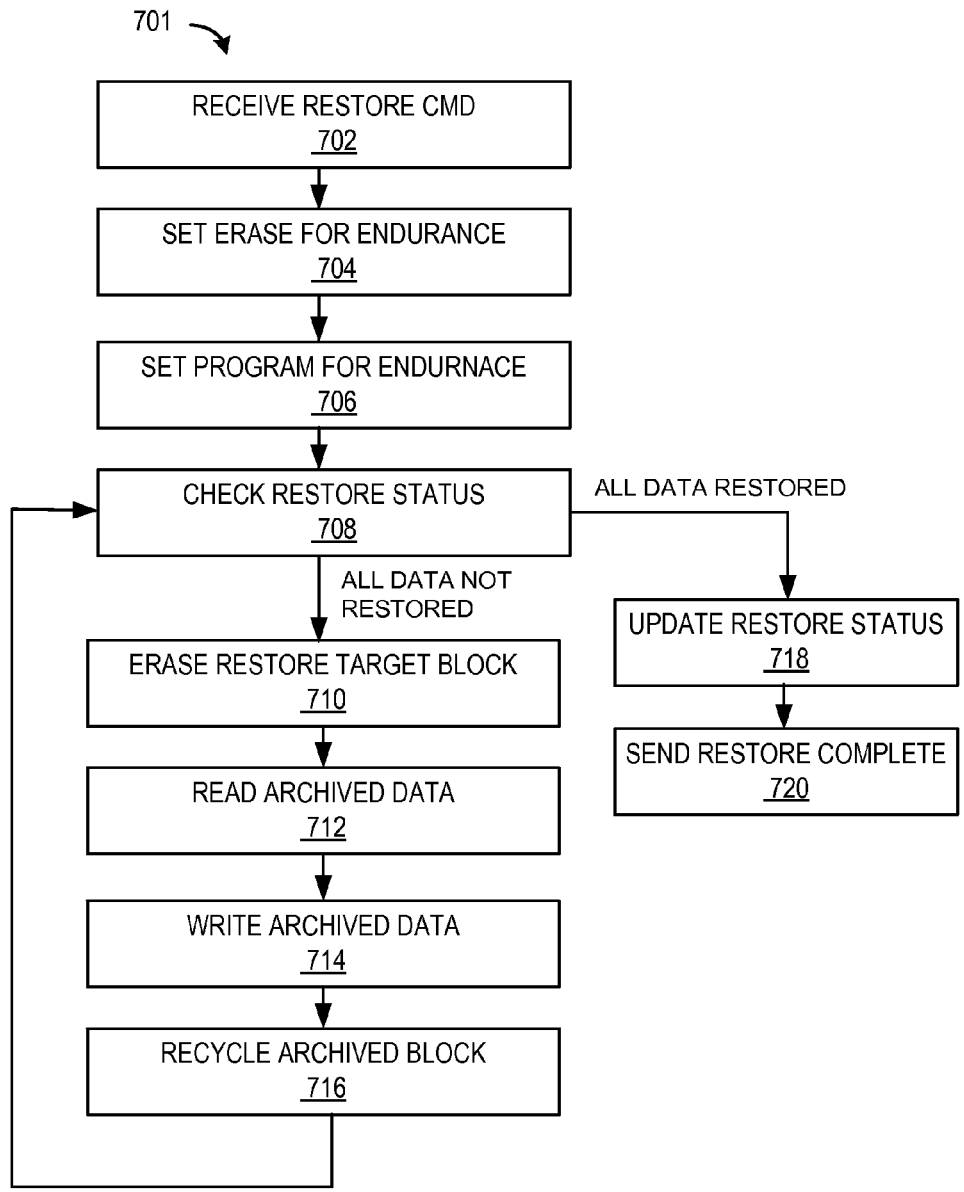
FIG. 7 is a control flow of a restore process of the data storage system of FIG. 1.

Referring now to FIG. 7, therein is shown a control flow of a restore process 701 of the data storage system 100 of FIG. 1. The restore process 701 can preserve the data of the data storage system 100 by copying the data of the archived data block 218 of FIG. 2 to the target block 212 of FIG. 2 with the command settings 410 of FIG. 4 configured to maximize the data endurance count 234 of FIG. 2 of the target block 212.

The restore process 701 can receive the restore command 502 of FIG. 5 from the host device 140 of FIG. 1 in a receive restore command module 702. The receive restore command module 702 can detect the current state of the data storage system 100 and restart the restore process 701 if the restore status 520 indicate that the restore process 701 is in progress. Receiving the restore command 502 can prepare the data storage system 100 to copy the archived data to new blocks on the data storage system 100 to refresh the data for maximizing data endurance.

The receive restore command module 702 can define the state of the data storage system 100 by adjusting the restore status 520 of FIG. 5 and the archive status 420 of FIG. 4. For example, the restore status 520 can be set to "Restore in progress" to indicate that restore process 701 has been started and the archive status 420 can be set to a blank value.

The restore command 502 can also be automatically generated when the data storage system 100 is connected to the host device 140 of FIG. 1. The controller 102 of FIG. 1 can detect the host device 140 via the host interface 114 of FIG. 1 and generate the restore command 502 automatically.

If the restore status 520 indicates that the restore process 701 has already been initiated and has been interrupted, then the restore process 701 can be automatically restarted if the host device 140 has been disconnected and then reconnected if the restore status 520 indicates that the restore process has not finished.

The restore process 701 includes copying the data of all of the memory blocks 204 of FIG. 2 previously optimized for data retention and rewriting the memory blocks 204 to the data storage system 100 with the command settings 410 configured to maximize data endurance. The restore process 701 can continue and be restarted until all data has been restored.

The control flow of the restore process 701 can proceed to a set erase endurance module 704. The set erase endurance module 704 can configure the command settings 410 for maximum data endurance. Data endurance can be optimized without regard for data retention. The execution of the erase command can erase the memory blocks 204 of the data storage system 100 to prepare for programming the memory blocks 204 with new data.

The set erase endurance module 704 can configure the erase command to maximize the data endurance count 234 of the erase command in a variety of ways. For example, the command settings 410 can be configured to maximize the data endurance count 234 by modifying the configuration of the erase block pool 310 of FIG. 3 such that the erase block 214 of FIG. 2 having the program erase cycle count 224 of FIG. 2 with the lowest value is positioned at the beginning of the erase block pool 310. In another example, the erase command can be configured to insert the erase block 214 having the program erase cycle count 224 with higher values at the end of the erase block pool 310.

In another example, the command settings 410 can be configured to maximize the data endurance count 234 by modifying the command flags 418 of FIG. 4 to change the operational characteristics used during the execution of the erase command. For example, the command settings 410 can be configured to change the duration of the program pulse to reduce the amount of charge stored in the cell array 132 of FIG. 1 on erase to increase data endurance of the cell array 132.

In yet another example, the command settings 410 can be configured to maximize the data endurance count 234 by preparing the target block 212 for a level of error correction code data commensurate with normal data endurance operation. Preparing the target block 212 can include freeing memory space for the error correction codes in the overprovisioning area 230 of FIG. 2 and limiting the storage of the error correction code 220 of FIG. 2 to the memory pages 206 of FIG. 2. By altering the level of error correction coding, the data stored in the target block 212 can increase the data endurance count 234 of the target block 212.

The control flow of the restore process 701 can proceed to a set program endurance module 706. The set program endurance module 706 can configure the command settings 410 to maximize the data endurance count 234 of the program command in a variety of ways.

For example, the command settings 410 can be configured by setting the command flags 418 to indicate that the payload data should be distributed across the minimum number of the memory blocks 204. Distributing the payload data can include copying the data of the memory pages 206 of the two or more of the archived data block 218 to the target block 212.

In another example, the command settings 410 can be configured by setting the command flags 418 to indicate that the payload data should be stored equally across the memory pages 206 of the target block 212 without regard to fast or slow page status. By writing the payload data to both fast and slow pages, the overall number of the memory blocks 204 needed to store the payload data can be reduced. Using fewer of the memory blocks 204 can reduce the total number of program and erase cycles, and reduce the impact on the data endurance count 234.

The command settings 410 can be configured by setting the error correction code level 414 of FIG. 4 to the default level of error correction. For example, the error correction code level 414 can indicate that the error correction code unit 112 of FIG. 1 should use a 55-bit BCH code.

In another example, the command settings 410 can be configured to maximize the data endurance count 234 by setting the command flags 418 of FIG. 4 to select the duration and timing, default programming voltages, plane operation, or a combination thereof for maximum endurance. The command settings 410 can be set to maximize the data endurance count 234 without regard for the impact of data retention.

The command flags 418 can be configured to implement multi-plane operation for restoring the archived payload data. The data storage system 100 can operate using multi-plane operations for better bandwidth, data transfer performance, and reduced runtime power consumption. However, multi-plane operation can cause an increase in the bit error rate and an increased failure rate of the flash. Setting the command flags 418 for multi-plane operation can improve the data endurance count 234

The control flow of the restore process 701 can proceed to a restore status check module 708 to determine if all of the data on the data storage system 100 has been restored. If the restore status check module 708 indicates that all data has been successfully restored, then control flow passes to an update restore status module 718. The update restore status module 718 can update the restore status 520 of the data storage system 100 by setting the restore status to indicate all of the data has been restored.

After the restore status 520 has been updated, the control flow can pass to a send restore complete module 720. The send restore complete module 720 can send a restore status message to the host device 140 via the host interface 114 of the data storage system 100. The restore status message 504 of FIG. 5 can inform the host device 140 that the restore process 701 has completed and the data storage system 100 can be safely used.

If the restore status check module 708 indicates that not all of the data on the data storage system 100 has been restored, then the control flow can pass to an erase restore target block module 710. The erase restore target block module 710 can identify the target block 212 and erase the target block 212 using the command settings 410 configured to maximize data endurance.

The erase restore target block module 710 can identify the target block 212 in a variety of ways. For example, the target block 212 can be assigned to be the erase block 214 at the top of the erase block pool 310.

In another example, if the erase block pool 310 does not have an available entry for the erase block 214, then the erase restore target block module 710 can initiate a garbage collection process to recover the memory blocks 204 previously identified as unused to add to the erase block pool 310. The erase block pool 310 can be updated by adding the erase block 214 at the top of the list and assigning the erase block 214 to be the target block 212. Recovering the memory blocks 204 is defined as adding the memory blocks 204 to the erase block pool 310.

The target block 212 can be erased using the command settings 410 configured to maximize data endurance. The target block 212 can be erased and all of the data bits of the target block 212 can be set to 1.

The control flow of the restore process 701 can proceed to a read archived data module 712. The read archived data module 712 can identify the archived data block 218 to be programmed to the target block 212. The archived data block 218 is defined as one of the memory blocks 204 containing payload data that has been archived for maximum data retention.

The archived data block 218 can be read in a variety of ways. For example, the archived data block 218 can be retrieved and buffered in the random access memory 120 of FIG. 1. In another example, the archived data block 218 can be identified from the list of the memory blocks 204 of the payload data and flagged as the archived data block 218.

The control flow of the archive process 601 of FIG. 6 can proceed to a write archived data module 714. The write archived data module 714 can write the archived data block 218 to the target block 212 with the command settings 410 configured to maximize data endurance. The target block 212 can be configured as a high endurance block that has been optimized for data endurance.

The archived data block 218 can be written to the target block 212 in a variety of ways. For example, the archived data block 218 can be written to the target block 212 from the random access memory 120 using the program command with the command settings 410 configured to maximize data endurance. The logical to physical table 302 of FIG. 3 can be updated to replace the physical block address of the archived data block 218 with the physical block address of the target block 212.

In another example, the archived data block 218 can be written to the target block 212 using an internal copy command optimized for data endurance. The execution of the internal copy command can copy the data of the archived data block 218 directly from the archived data block 218 in the memory arrays 106 to the target block 212 in the memory arrays 106 without transferring the data out of the memory arrays 106.

The control flow of the restore process 701 can proceed to a recycle archived data module 716. The recycle archived data module 716 can recycle the archived data block 218 by tagging the archived data block 218 of FIG. 2 as invalid and adding the archived data block 218 to the erase block pool 310.

At the completion of the recycle archived data module 716, the control flow of the restore process 701 can proceed back to the restore status check module 708. The restore process 701 can form a loop for checking the restore status 520, reading the data of the archive block memory blocks, writing the data of the archived data block 218 to the target block 212, and recycling the copied instances of the archived data block 218. The loop can continue until all of the archived payload data has been restored.

The restore process 701 can be interrupted by disconnecting the data storage system 100 from the host device 140. The data storage system 100 can restart the restore process 701 when reconnected to the host device 140 by detecting the connection the host device 140 and automatically generating the restore command 502. In another example, the restore process 701 can be restarted by applying power to the data storage system 100 and examining the restore status 520. The restore status 520 can be stored in non-volatile memory, for example in the overprovisioning area 230.

It has been discovered that the present invention provides improved data endurance for the storage of payload data of the memory blocks 204 by restoring the archived data block 218 to the minimum number of the memory blocks 204 needed to hold the payload data. By reducing the total number of memory blocks 204, the number of program and erase cycles is minimized, reducing the overall effect on the data endurance of the memory blocks 204.

It has been discovered that the present invention provides improved data endurance time for the storage of the payload data of the memory blocks 204 of the memory arrays 106 during the restore process by copying the data of the archived data block 218 to the target block 212 using the command settings 410 configured to maximize data endurance. By copying all of the payload data by reading the archived data block 218 and programming the target block 212 with the payload data, the target block 212 will be refreshed and can have a longer data endurance time.

It has been discovered that the present invention provides improved data safety by automatically restarting the restore process 701 when the data storage system 100 receives power or is reconnected to the host device 140. By automatically continuing the restore process 701, the host device 140 can be provided with a valid set of data when the host device 140 receives the restore status message 504 of FIG. 5.

It has been discovered that the present invention provides improved data endurance and improved effective operation lifetime by restoring the archived data block 218 to the target block 212 with the command settings 410 configured to maximize data endurance in the restore process 701. By restoring and configuring the memory blocks 204 for data endurance instead of data retention, the effective operational lifetime of the data storage system 100 can be increased.

Figure 8:
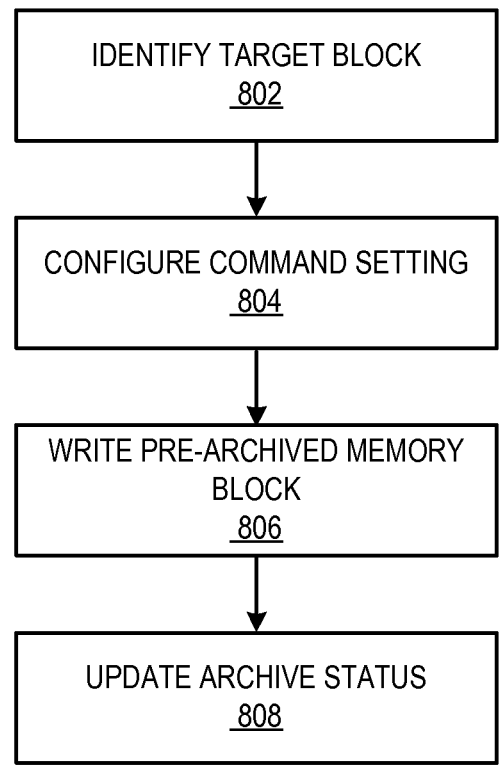
FIG. 8 is a flow chart of a method of operation of the data storage system in a further embodiment of the present invention.

Referring now to FIG. 8, therein is shown a flow chart of a method 800 of operation of the data storage system in a further embodiment of the present invention. The method 800 includes: identifying a target block in a block 802; configuring a command setting for maximizing a data retention period of the target block in a block 804; writing a pre-archived memory block to the target block based on the command setting in a block 806; and updating an archive status for sending to a host device in a block 808.

Thus, it has been discovered that the data storage system of the present invention furnishes important and heretofore unknown and unavailable solutions, capabilities, and functional aspects for data storage system configurations. The resulting processes and configurations are straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a data storage system comprising:
   receiving an archive command;
   in response to receiving the archive command:
      writing data from a pre-archived data block of the data storage system to a first target block of the data storage system in accordance with a first set of command settings, wherein the first target block comprises an archived data block of the data storage system,
      updating an archive status of the pre-archived data block, and
      sending the updated archive status to a host device; and
   receiving a restore command;
   in response to receiving the restore command:
      writing data from the archived data block of the data storage system to a second target block of the data storage system in accordance with a second set of command settings distinct from the first set of command settings,
      updating a restore status of the archived data block, and
      sending the updated restore status to the host device.

2. The method of claim 1, wherein the restore command is triggered when the data storage system receives operating electrical power.

3. The method of claim 1, wherein the archive command and the restore command are received from the host device.

4. The method of claim 1, wherein the first set of command settings is configured to maximize data retention of the first target block.

5. The method of claim 1, wherein the second set of command settings is configured to maximize data endurance of the second target block.

6. The method of claim 1, further comprising writing data, during routine usage of the data storage system, in accordance with a third set of command settings, wherein the first, second, and third set of command settings are distinct from one another.

7. The method of claim 1, wherein writing data from the pre-archived data block includes writing data from the pre-archived data block to a fast page of the first target block.

8. The method of claim 1, wherein command settings include at least one setting selected from the group consisting of:
   a storage temperature of the data storage system; an error correction code level; a duration or timing for writing to a respective target block; one or more voltage levels for control signals used to read, store, and/or erase data in a respective target block; a setting requiring single plane operation within a respective target block; and a setting for writing the pre-archived data block equally across memory pages of a respective target block.

9. The method of claim 1, further comprising configuring the first set of command settings, wherein configuring includes selecting a modified error correction code level to compensate for an expected storage temperature of the data storage system.

10. The method of claim 1, further comprising:
    erasing, in response to receiving the archive command, the first target block of the data storage system in accordance with the first set of command settings; and
    erasing, in response to receiving the restore command, the second target block of the data storage system in accordance with the second set of command settings.

11. The method of claim 10, wherein command settings include at least one setting selected from a group consisting of:

a program erase cycle count, a program erase cycle count threshold, and a duration of an erase pulse for erasing a respective target block.

12. A data storage system comprising:
a memory array having a first target block and a second target block;
a control unit, coupled to the memory array, for configuring a first set of command settings and a second set of command settings distinct from the first set of command settings;
a memory interface, coupled to the memory array, for:
writing, in response to receiving an archive command, data from a pre-archived data block of the data storage system to the first target block of the data storage system in accordance with the first set of command settings, wherein the first target block comprises an archived data block of the data storage system, and
writing, in response to receiving a restore command, data from the archived data block of the data storage system to the second target block of the data storage system in accordance with the second set of command settings;
an error correction code unit, coupled to the control unit, for calculating an error correction code for the first target block and the second target block; and
a host interface, coupled to the control unit, for:
updating an archive status of the pre-archived data block and a restore status of the archived data block, and
sending the updated archive status and the updated restore status to a host device.

13. The data storage system of claim 12, wherein the restore command is triggered when the data storage system receives operating electrical power.

14. The data storage system of claim 12, wherein the archive command and the restore command are received from the host device.

15. The data storage system of claim 12, wherein the first set of command settings is configured to maximize data retention of the first target block.

16. The data storage system of claim 12, wherein the second set of command settings is configured to maximize data endurance of the second target block.

17. The data storage system of claim 12, wherein the memory interface is further for:
writing data, during routine usage of the data storage system, in accordance with a third set of command settings, wherein the first, second, and third set of command settings are distinct from one another.

18. The data storage system of claim 12, wherein writing the pre-archived data block includes writing the pre-archived data block to a fast page of the target block.

19. The data storage system of claim 12, wherein command settings include at least one setting selected from the group consisting of:
a storage temperature of the data storage system; an error correction code level; a duration or timing for writing to a respective target block; one or more voltage levels for control signals used to read, store, and/or erase data in a respective target block; a setting requiring single plane operation within a respective target block; and a setting for writing the pre-archived data block equally across memory pages of a respective target block.

20. The data storage system of claim 12, wherein configuring a respective set of command settings includes selecting a modified error correction code level to compensate for an expected storage temperature of the data storage system.

21. The data storage system of claim 12, the memory interface further for:
erasing, in response to receiving the archive command, the first target block of the data storage system in accordance with the first set of command settings; and
erasing, in response to receiving the restore command, the second target block of the data storage system in accordance with the second set of command settings.

22. The data storage system of claim 21, wherein command settings include at least one setting selected from a group consisting of:
a program erase cycle count, a program erase cycle count threshold, and a duration of an erase pulse for erasing a respective target block.

* * * * *